(12) United States Patent
Powers et al.

(10) Patent No.: US 10,399,797 B2
(45) Date of Patent: Sep. 3, 2019

(54) FLOW CONTROL APPARATUS FOR CARRIER FLUID

(71) Applicant: Shick Solutions, Inc., Kansas City, MO (US)

(72) Inventors: Richard Garvin Powers, Overland Park, KS (US); Greggory Scott Karr, Raymore, MO (US); Dennis Aaron Irvin, Freeman, MO (US)

(73) Assignee: Shick Solutions, Inc., Kansas City, MO (US)

( * ) Notice: Subject to any disclaimer, the term of this patent is extended or adjusted under 35 U.S.C. 154(b) by 0 days.

(21) Appl. No.: 15/668,287

(22) Filed: Aug. 3, 2017

(65) Prior Publication Data

US 2018/0057281 A1    Mar. 1, 2018

Related U.S. Application Data

(60) Provisional application No. 62/495,015, filed on Aug. 29, 2016.

(51) Int. Cl.
| | |
|---|---|
| *B65G 53/66* | (2006.01) |
| *B65G 51/02* | (2006.01) |
| *B65G 53/52* | (2006.01) |
| *B65G 51/38* | (2006.01) |
| *B61B 13/12* | (2006.01) |

(52) U.S. Cl.
CPC .............. *B65G 51/02* (2013.01); *B65G 51/38* (2013.01); *B65G 53/525* (2013.01); *B65G 53/66* (2013.01); *B61B 13/122* (2013.01)

(58) Field of Classification Search
CPC ................................ B65G 53/14; B65G 53/66

USPC .................................................. 406/98, 144
See application file for complete search history.

(56) References Cited

U.S. PATENT DOCUMENTS

| | | | | |
|---|---|---|---|---|
| 2,987,221 A | * | 6/1961 | Milton | ................. B05B 7/1404 222/1 |
| 2,994,344 A | | 8/1961 | Kerley | |
| 3,321,251 A | * | 5/1967 | Reiterer | ................. B65G 53/00 406/70 |
| 3,693,840 A | * | 9/1972 | Starr | ........................ A21C 9/04 406/129 |
| 4,049,405 A | * | 9/1977 | Goldsmith | ............. B01D 53/02 55/479 |
| 4,067,692 A | * | 1/1978 | Farris | ..................... A61L 9/122 422/124 |

(Continued)

FOREIGN PATENT DOCUMENTS

EP            2003075 A1    12/2008

*Primary Examiner* — Joseph A Dillon, Jr.
(74) *Attorney, Agent, or Firm* — Erise IP, P.A.

(57) ABSTRACT

A tubular conveyance system includes a pressure sensor, a blower, a material feeder, and a flow control apparatus. The pressure sensor is configured to be associated with a conveyance tube. The blower is configured to accelerate a carrier fluid into the conveyance tube. The material feeder is disposed downstream of the blower and configured to add a conveyance material to the conveyance tube to be conveyed by the carrier fluid. The flow control apparatus is configured to control an amount of carrier fluid provided to the blower. The flow control apparatus includes a mobile plate having a mobile plate opening therein, and a drive mechanism configured to selectively place the mobile plate into an open position and a closed position.

19 Claims, 7 Drawing Sheets

(56) References Cited

U.S. PATENT DOCUMENTS

| | | | |
|---|---|---|---|
| 4,527,595 A | | 7/1985 | Jorgensen et al. |
| 4,824,295 A | | 4/1989 | Sharpless |
| 4,846,608 A | * | 7/1989 | Sanders ................ B65G 53/14 406/144 |
| 5,407,305 A | * | 4/1995 | Wallace ................ B65G 53/66 406/11 |
| 5,813,801 A | * | 9/1998 | Newbolt ................ B65G 53/66 406/14 |
| 8,061,295 B2 | * | 11/2011 | Zimmerman ......... E01C 23/166 118/308 |
| 8,113,745 B2 | | 2/2012 | Aoki |
| 8,202,146 B1 | * | 6/2012 | Johnson ................ F24F 7/06 454/187 |
| 8,360,691 B2 | * | 1/2013 | Moretto ................ B65G 53/66 406/17 |
| 8,747,029 B2 | * | 6/2014 | Thorn ................... B65G 53/66 406/127 |
| 8,936,416 B2 | * | 1/2015 | Stutz, Jr. .............. B65G 53/40 222/400.5 |
| 9,181,044 B1 | | 11/2015 | Baker |
| 9,611,106 B2 | | 4/2017 | Tell |
| 2004/0250372 A1 | * | 12/2004 | McElroy ................ B60S 3/002 15/316.1 |
| 2010/0083526 A1 | * | 4/2010 | Johnson ................ F26B 21/001 34/443 |
| 2014/0000720 A1 | * | 1/2014 | Mortzheim ............ F16K 24/00 137/1 |
| 2015/0232288 A1 | | 8/2015 | De Jager et al. |
| 2015/0344242 A1 | | 12/2015 | Celella |
| 2016/0096693 A1 | | 4/2016 | Hanaoka et al. |
| 2016/0280473 A1 | | 9/2016 | Veselov et al. |

\* cited by examiner

FLOW CONTROL APPARATUS FOR CARRIER FLUID

RELATED APPLICATIONS

This non-provisional patent application claims priority benefit, with regard to all common subject matter, of earlier-filed U.S. Provisional Patent Application No. 62/495,015, filed on Aug. 29, 2016, and entitled "CARRIER GAS FLOW CONTROL APPARATUS FOR TUBULAR CONVEY SYSTEMS" (the '015 Application). The '015 Application is hereby incorporated by reference in its entirety into the present application.

BACKGROUND

1. Field

Embodiments of the invention are broadly directed to the control of a carrier fluid of tubular conveyance systems.

2. Related Art

Tubular conveyance systems are used to move conveyance materials and other materials. For example, some tubular conveyance systems may be utilized for moving conveyance material from a railcar, tractor trailer, or sack to a silo, use bin, hopper, or other storage container. Tubular conveyance systems are utilized in various industries such as food preparation, pharmaceuticals, chemical processing, plastics, mines, cement/asphalt, and power plants. Typical materials include cement, ore, sugar, minerals, grains, plastics, dust, fly ash, flour, gypsum, lime, coffee, cereals, pharmaceuticals, and other conveyance materials. An efficient tubular conveyance system should be able to transport large amounts of conveyance material steadily and continuously with minimum energy input. Doing so requires precise control of the carrier fluid, such as air, that is allowed to inlet into the system. Tubular conveyance systems of the prior art rely on simple valves to control this inlet, resulting in inaccurate, slow, and latent adjustments to the inlet of carrier fluid.

SUMMARY

Embodiments of the invention solve these problems by providing a flow control apparatus configured to precisely and quickly control the amount of carrier fluid that is allowed in inlet into the tubular conveyance system. Sensors detect downstream flow conditions. Based upon readings of these sensors, a mobile plate is moved by a drive mechanism between an open position, a closed position, and a plurality of intermediate positions. The mobile plate therefore allows only a certain amount of carrier fluid to enter the conveyance system.

A first embodiment of the invention is broadly directed to a tubular conveyance system comprising a pressure sensor, a blower, a material feeder, and a flow control apparatus. The pressure sensor is configured to be associated with a conveyance tube. The blower is configured to accelerate a carrier fluid into the conveyance tube. The material feeder is disposed downstream of the blower and configured to add a conveyance material to the conveyance tube to be conveyed by the carrier fluid. The flow control apparatus is configured to control an amount of carrier fluid provided to the blower. The flow control apparatus includes a mobile plate having a mobile plate opening therein, and a drive mechanism configured to selectively place the mobile plate into an open position and a closed position.

A second embodiment of the invention is broadly directed to a flow control apparatus configured to control an amount of carrier fluid provided to a blower of a tubular conveyance system. The flow control apparatus comprises a mobile plate, a static plate, and a drive mechanism. The mobile plate has a mobile plate opening therein. The static plate has a static plate opening therein. The mobile plate is secured adjacent to the static plate. The drive mechanism configured to selectively place the mobile plate into an open position and a closed position. The open position is defined as at least a portion of the mobile plate opening being aligned with at least a portion of the static plate opening.

A third embodiment of the invention is broadly directed to a method for controlling the flow of carrier fluid into a fluid conveyance system to keep a constant flow rate throughout the conveyance system. The method of this embodiment comprises the following steps: receiving, from a first pressure transducer, a first pressure reading from an upstream location relative to a blower that is indicative of an inlet pressure; receiving, from a second pressure transducer, a second pressure reading from a downstream location relative to the blower that is indicative of an outlet pressure; determining, based at least in part on the first pressure reading and the second pressure reading, an ideal upstream pressure for a constant flow rate through the blower; and instructing a drive mechanism to move a mobile plate to an open position such that the inlet pressure approaches the ideal upstream pressure.

Additional embodiments of the invention may be directed to a conveyance system comprising a flow control apparatus, a pressure sensor, and a blower. Still other embodiments of the invention may comprise a conveyance system comprising a flow control apparatus and a material feeder.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 7 is a top view of a mobile plate, an upper static plate, and a lower static plate associated with the flow control apparatus;

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
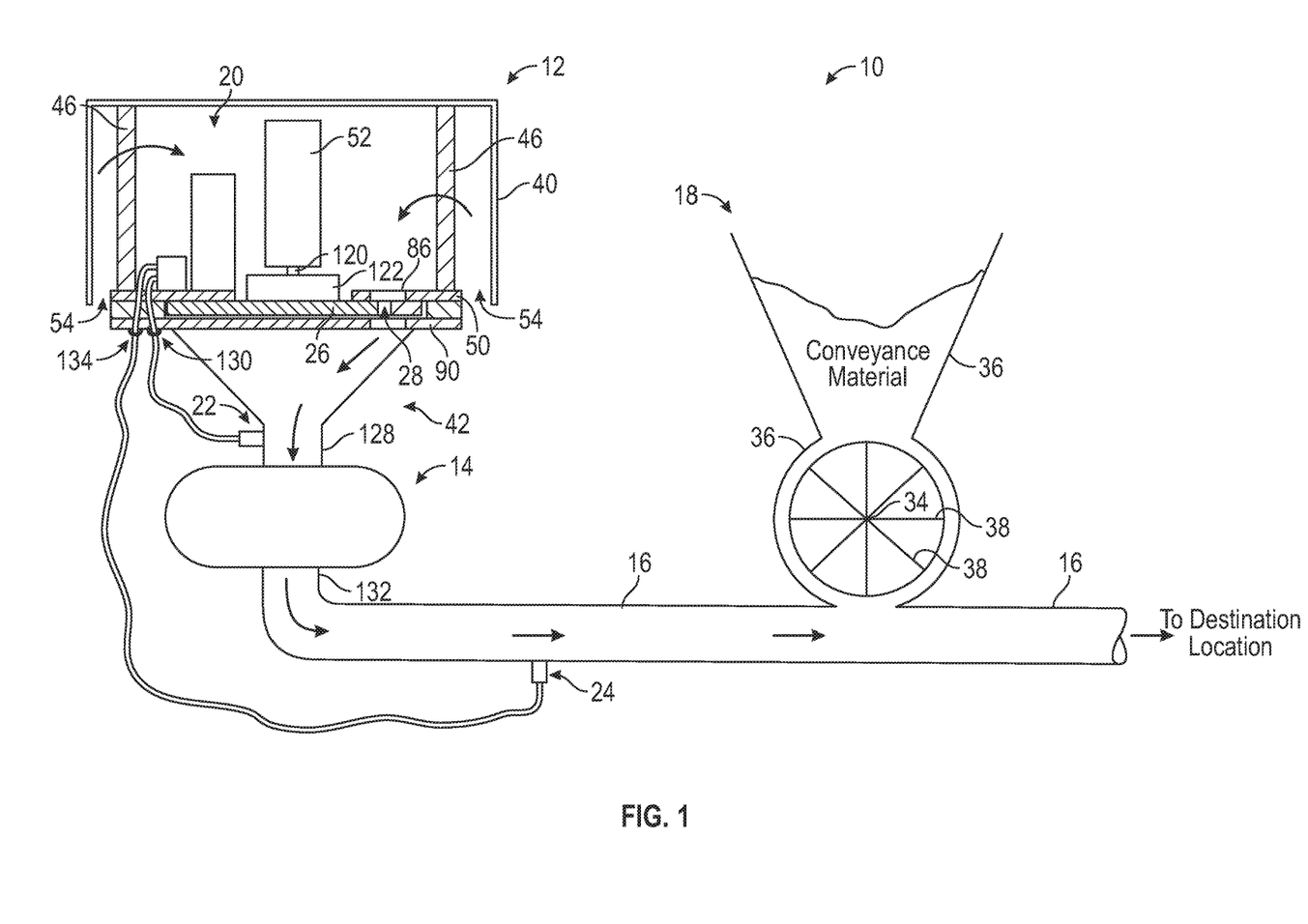
FIG. 1 is a schematic diagram illustrating a tubular conveyance system including a flow control apparatus.

Turning to FIG. 1, a tubular conveyance system 10 is shown. The tubular conveyance system 10 of embodiments of the invention comprises a flow control apparatus 12, a blower 14, a conveyance tube 16, and a material feeder 18. The flow control apparatus 12 allows a carrier fluid, such as air, to enter the system. The carrier fluid is then accelerated by the blower 14 into the conveyance tube 16. The material feeder 18 provides a conveyance material to the conveyance tube 16 for movement by the carrier fluid.

Broadly, the tubular conveyance system 10 moves a conveyance material from an origin location to a destination location. The tubular conveyance system 10 moves the conveyance material by providing a moving carrier fluid in proximity to the conveyance material. The moving carrier fluid exerts a force on the conveyance material, pushing the conveyance material toward the destination location. The conveyance material moves through the conveyance tube 16 until it reaches the destination location. Because the conveyance material is composed of individual solid or semi-solid particles, forces exerted on each particle are difficult to predict and calculate. The conveyance material may tend to bunch together in certain locations (such as inclines and turns), and be sparse in other locations (such as declines and straightaways). Therefore, embodiments of the invention detect the current conditions within the conveyance tube 16 and adjust parameters based upon those conditions.

The force exerted on the conveyance material is caused by the molecules of the carrier fluid (such as air molecules) colliding, either directly or indirectly, with the particles of the conveyance material. Therefore, one available method of adjusting parameters based upon the detected conditions in the conveyance tube 16 is to adjust the number of carrier fluid molecules that are passing through the conveyance tube 16. Reducing the number of molecules reduces the force, and increasing the number of molecules increases the force. The number of molecules of the carrier fluid present in the tubular conveyance system 10 is determined at least in part by the controlling the inlet of the carrier fluid into the tubular conveyance system 10.

Some embodiments of the invention are used for controlling the carrier fluid in a tubular conveying system. The system includes the flow control apparatus 12 to restrict the source of a carrier fluid, most commonly air or another gas, into the inlet of the blower 14 such as a rotary blower, screw compressor, fan, or compressed air pump. A controller 20 is configured to perform calculations for operating the flow control apparatus 12 variably between an open position and a closed position, varying the gas flow into the blower 14. The outlet of the blower 14 is fluidly connected with the inlet of the tubular conveyance system 10. A first pressure sensor 22 is configured to monitor the intake pressure between the flow control apparatus 12 and the intake of the blower 14 and communicate a first sensor reading to the controller 20. A second pressure sensor 24 is configured to monitor the discharge pressure of the blower 14 and communicate a second sensor reading to the controller 20. The controller 20 will perform calculations based on the information it receives from the pressure sensing devices and send a command to move the internal components of the flow control apparatus 12 that will restrict the air movement to the inlet of the blower 14. The flow control apparatus 12 movement will cause the blower 14 to control the mass flow rate of the carrier fluid.

The components of the tubular conveyance system 10 will now be discussed in more detail. As illustrated in FIG. 1, in embodiments of the invention, the tubular conveyance system 10 comprises the pressure sensor, the blower 14, the material feeder 18, and the flow control apparatus 12. The pressure sensor is configured to be associated with a conveyance tube 16. The blower 14 is configured to accelerate the carrier fluid into the conveyance tube 16. The material feeder 18 is downstream of the blower 14 and configured to add a conveyance material to the conveyance tube 16 to be conveyed by the carrier fluid. The flow control apparatus 12 controls the amount of carrier fluid that is provided to the blower 14.

In some embodiments, the tubular conveyance system 10 is laid out in a general layout such as shown in FIG. 1. The tubular conveyance system 10 is laid out to move the conveyance material from the initial location to the destination location. The tubular conveyance system 10 therefore includes a conveyance tube 16 that is located between the initial location and the destination location. The conveyance tube 16 may be laid out in a static or a mobile arrangement. The conveyance tube 16 may include turns, inclines, declines, and other changes in direction. In some embodiments, not illustrated, the destination location for a first tubular conveyance system may be the initial location for a second tubular conveyance system, such that the conveyance material is deposited into a second material feeder 18.

The flow control apparatus 12 is configured to control an amount of carrier fluid provided to the blower 14. The flow control apparatus 12 includes a mobile plate 26 having a mobile plate opening 28 therein, and a drive mechanism 52 (such as a drive motor) configured to selectively place the mobile plate 26 into an open position and a closed position. In embodiments of the invention, the drive mechanism 52 also moves the mobile plate 26 to a plurality of intermediate positions between the open position and the closed position. These intermediate positions allow precise flow control. The flow control apparatus 12 is discussed in much more depth below. It should be noted that FIG. 1 illustrates a different embodiment of the flow control apparatus 12 than is illustrated in the other drawing figures.

The pressure sensor is configured to be associated with the conveyance tube 16. The pressure sensor may be configured to be installed within, adjacent to, or at least partially within the wall of the conveyance tube 16. Pressure is an expression of the force required to stop a fluid from expanding, and is usually stated in terms of force per unit area. A pressure sensor usually acts as a transducer; it generates a signal as a function of the pressure imposed. The signal may be generated by a capacitive, electromagnetic, piezoelectric, optical, potentiometric, or other type of sensor. In embodiments of the invention, the pressure sensor includes a first pressure transducer disposed upstream of the blower 14 and a second pressure transducer disposed downstream of the blower 14. The two pressure transducers therefore determine a pressure differential across the blower 14. Additional pressure transducers (not illustrated) may be disposed at other locations throughout the tubular conveyance system 10 to provide an indication of the conditions within the various locations throughout the tubular conveyance system 10.

In embodiments of the invention, the pressure sensor is associated (either directly or indirectly) with the flow control apparatus 12 to provide a pressure reading to the flow control apparatus 12. The pressure reading is used to determine whether the mobile plate 26 should be in the open position, the closed position, or one of the intermediate positions. In other embodiments, the pressure sensor is associated with a controller 20 that is independent of the flow control apparatus 12 and may be associated with one of the other components of the tubular conveyance system 10.

The blower 14 is configured to accelerate a carrier fluid into the conveyance tube 16. The blower 14 receives the carrier fluid from the flow control apparatus 12. The blower 14 then imparts a force on the particles of the carrier fluid. For example, the blower 14 may include a fan, a centrifugal blower, a positive displacement blower, a helical screw blower, a high-speed impeller blower, a regenerative blower, or other type of fluid accelerator. In embodiments of the invention, the blower 14 is configured to operate at a constant, or substantially constant, rate during operations. This is because altering the rate of the blower 14 causes inefficiencies and affects the downstream flow of the carrier fluid. The constant rate also makes the altering of the inlet carrier fluid more predictable. In other embodiments, the rate of the blower 14 may be varied. The variance of the blower 14 may be based at least in part on the type of conveyance material, the amount or rate of conveyance material, the layout of the conveyance tube 16, ambient conditions, the desired speed or rate of conveyance, and other considerations.

Continuing to move downstream, the material feeder 18 downstream of the blower 14 configured to add a conveyance material to the conveyance tube 16 to be conveyed by the carrier fluid. In embodiments of the invention, the material feeder 18 may be a rotary feeder. Components of a rotary feeder include a rotor shaft 34, housing 36, and at least one blade 38. The rotary feeder may be driven by an internal combustion or electric motor (not illustrated).

Once the conveyance material is fed into the conveyance tube 16 by the material feeder 18, forces are emplaced on the conveyance material by the carrier fluid. The carrier fluid, which has entered the system by the flow control apparatus 12 and been accelerated by the blower 14, pushes against the conveyance material so as to move the conveyance material along the conveyance tube 16. Some embodiments of the invention may include additional pressure sensors downstream of the material feeder 18 along the conveyance tube 16. These additional pressure sensors detect conditions along the conveyance tube 16. Readings from the additional sensors may be used in calculating the position of the mobile plate 26, as discussed in more depth below.

The flow control apparatus 12 will now be described in more detail. Various components of an exemplary flow control apparatus 12 are shown in FIGS. 2-9. It should be appreciated that while the figures and the below description describes the flow control apparatus 12 as a single contained unit, various embodiments of the invention may be assembled differently. For example, some components of the flow control apparatus 12 may be housed separately from the mobile plate 26, or may be housed adjacent to the mobile plate 26 instead of the above the mobile plate 26 as shown. The below description is provided to explain concepts to the reader, not to limit the invention.

Figure 2:
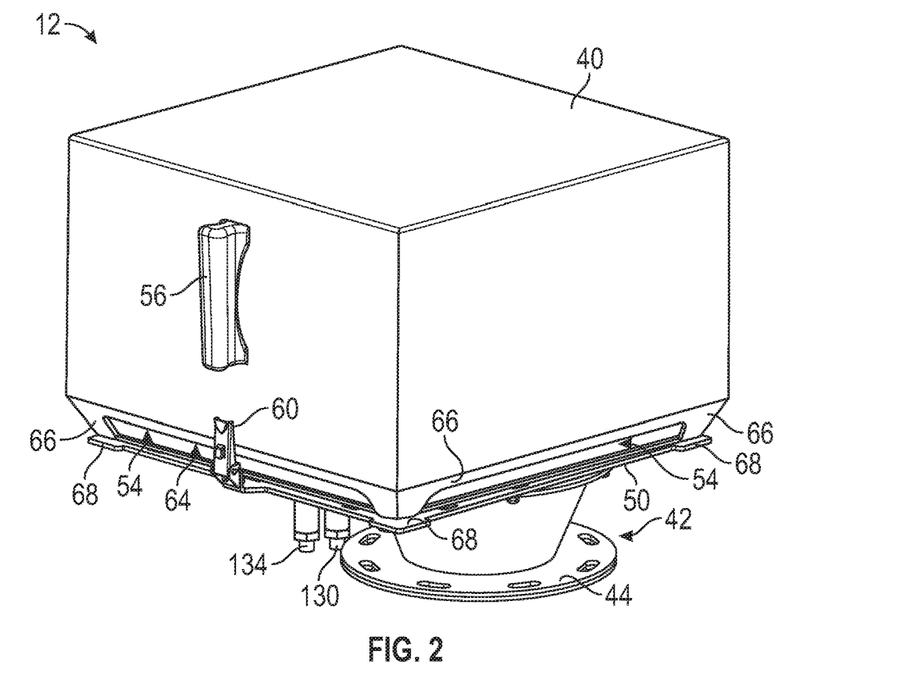
FIG. 2 is a perspective view of the flow control apparatus of FIG. 1.
Figure 3:
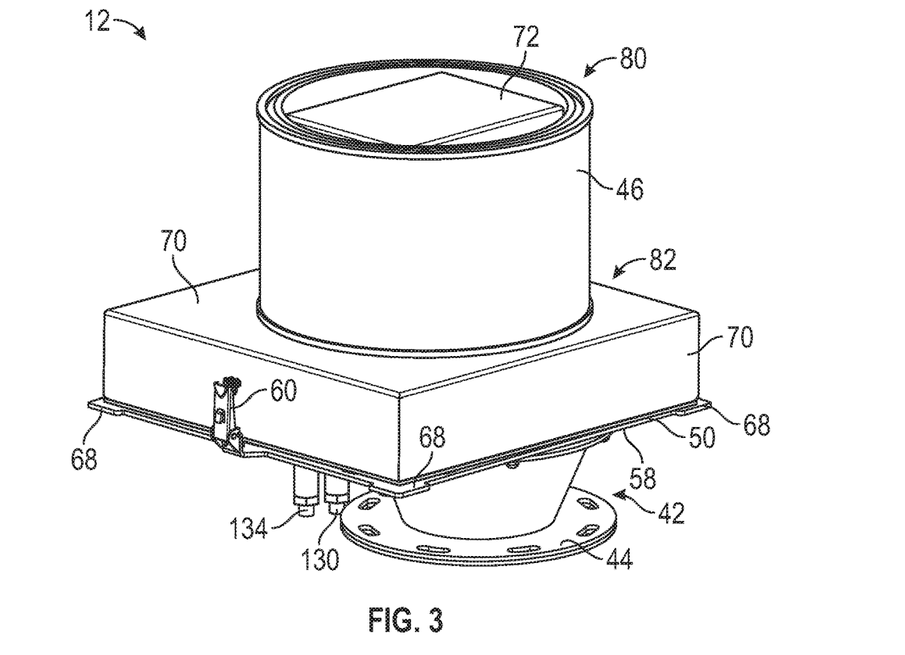
FIG. 3 is a perspective view of the flow control apparatus, having an outer cover removed.
Figure 4:
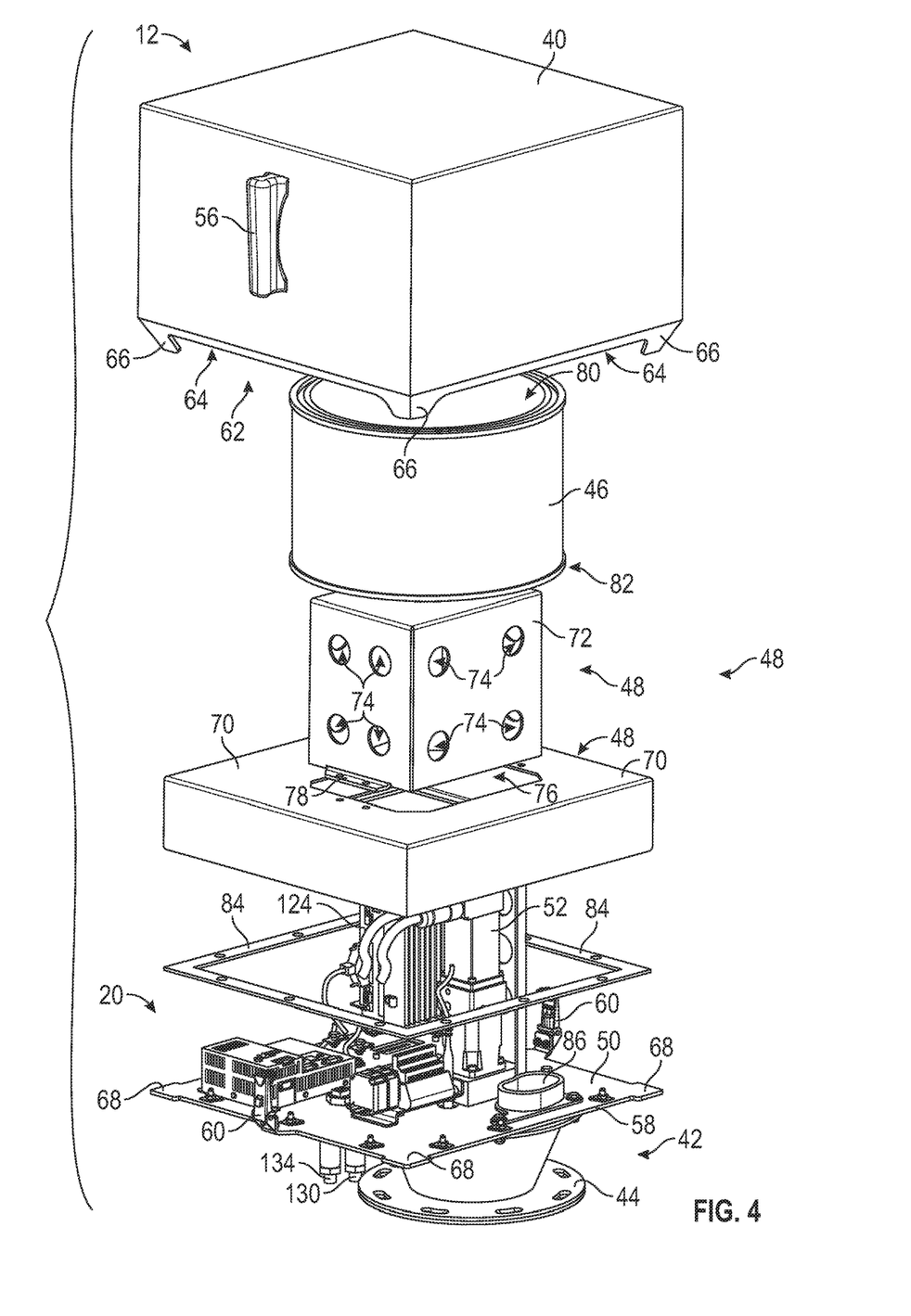
FIG. 4 is an exploded view of the flow control apparatus from FIG. 2.

Turning to FIGS. 2-4, components of the flow control apparatus 12 are shown. In embodiments of the invention, the flow control apparatus 12 is configured to control an amount of carrier fluid provided to the blower 14. The flow control apparatus 12 comprises an outer cover 40 and a tube interface 42. The flow control apparatus 12 is configured to allow carrier fluid, such as ambient air, to pass into the flow control apparatus 12. If the mobile plate 26 is in the open position (or in an intermediate position), the carrier fluid will pass through the tube interface 42 into the conveyance tube interface 42 and into the conveyance tube 16 and/or the blower 14. The tube interface 42 may be secured at an interface mount 44 to the blower 14 and/or to the conveyance tube 16.

In embodiments of the invention, the outer cover 40 houses a filter 46, an inner cover 48, the controller 20, the mobile plate 26 (illustrated in FIGS. 1 and 5), a static plate 50 (illustrated in FIGS. 1 and 5), and a drive assembly 52. The outer cover 40 presents at least one outer cover opening 54 to allow the carrier fluid to enter the tubular conveyance system 10 at or near ambient pressure. The blower 14, being disposed downstream of the flow control apparatus 12, creates a partial vacuum that draws carrier fluid molecules into the tubular conveyance system 10. These carrier fluid molecules pass through the outer cover opening 54. The outer cover 40 may further include a handle 56 to allow an operator to remove the outer cover 40. In embodiments of the invention, such as shown, the outer cover 40 rests against a support plate 58. The outer cover 40 may be retained against the support plate 58 by a retaining clip 60, as illustrated in FIGS. 2-3. The retaining clip 60 selectively holds the outer cover 40 against the support plate 58. The retaining clip 60 may be selectively disengaged by an operator in order to remove the outer cover 40 (such as for maintenance reasons). There may be a second retaining clip 60, as illustrated in FIG. 4 In other embodiments of the invention, the outer cover 40 may be secured to the support plate 58 with a fastener 128 (not illustrated) or by welding.

In embodiments of the invention, such as shown, the outer cover 40 presents a generally cubic or rectangular prism shape. This cubic or rectangular prism shape includes an open side 62 that is oriented downward such that the other components of the flow control apparatus 12 are contained therein, as illustrated in FIG. 4. In embodiments of the invention, the outer cover openings 54 are disposed adjacent to the open side 62. The outer cover 40 may therefore present four outer cover openings 54 (or one outer cover opening 54 per side if the outer cover 40 is another shape). The outer cover openings 54 may therefore be a recess 64 each associated with a cover protrusion 66 on each side thereof. The support plate 58 may have a corresponding plate protrusion 68 such that the outer cover openings 54 are presented between the outer cover 40 and the support plate 58. Carrier fluid entering the outer cover 40 will therefore pass between the outer cover 40 and the support plate 58, then move past the inner cover 48 and through the filter 46 (as discussed below).

The inner cover 48 and the filter 46 ensure that all (or substantially all) carrier fluid passes through the filter 46 before entering the conveyance system 10. The inner cover 48 provides structural support and protection for the various internal components of the flow control apparatus 12. The inner cover 48 may further provide support for the filter 46 being emplaced thereon. In embodiments of the invention, the inner cover 48 comprises a lower inner cover 70 and an upper inner cover 72. The lower inner cover 70 is disposed below the upper inner cover 72. The lower inner cover 70 is secured to, or adjacent to, the support plate 58. The lower inner cover 70 has a horizontal cross-sectional area that is the same as, or slightly smaller than, the support plate 58. The lower inner cover 70 is also substantially solid, such that carrier fluid is preventing from moving therethrough.

The upper inner cover 72 is disposed above the lower inner cover 70 and surrounded by the filter 46, as best illustrated in FIG. 3. The upper inner cover 72 presents at least one upper inner cover opening 74 so as to be porous. The upper inner cover openings 74 allow the carrier fluid to pass therethrough into the interior of the flow control apparatus 12. The lower inner cover 70 may also present a lower inner cover opening 76 to allow the carrier fluid to pass down into the lower inner cover 70. The upper inner cover 72 may be secured to the lower inner cover 70 such as by a fastener 128 (not illustrated) through two or more corresponding fastener 128 openings 78 in the upper inner cover 72 and the lower inner cover 70.

The filter 46 is associated with the outer cover 40 and/or the inner cover 48. The filter 46 prevents foreign debris from entering the conveyance system 10. Examples of foreign debris include dirt, dust, or conveyance material. Allowing foreign debris into the conveyance system 10 can cause damage to the various electrical and other components, may restrict the flow of the conveyance fluid, and may contaminate the conveyance material that is conveyed. In embodiments of the invention, such as illustrated in FIG. 3, the filter 46 may present an open-ended cylinder shape. The filter 46 may have an upper open end 80 and a lower open end 82. The upper open end 80 is against an inner surface of the outer cover 40. In some embodiments, the upper open end 80 is at approximately the same height as the upper inner cover 72, such that the upper inner cover 72 supports at least a portion of the weight of the outer cover 40.

Figure 5:
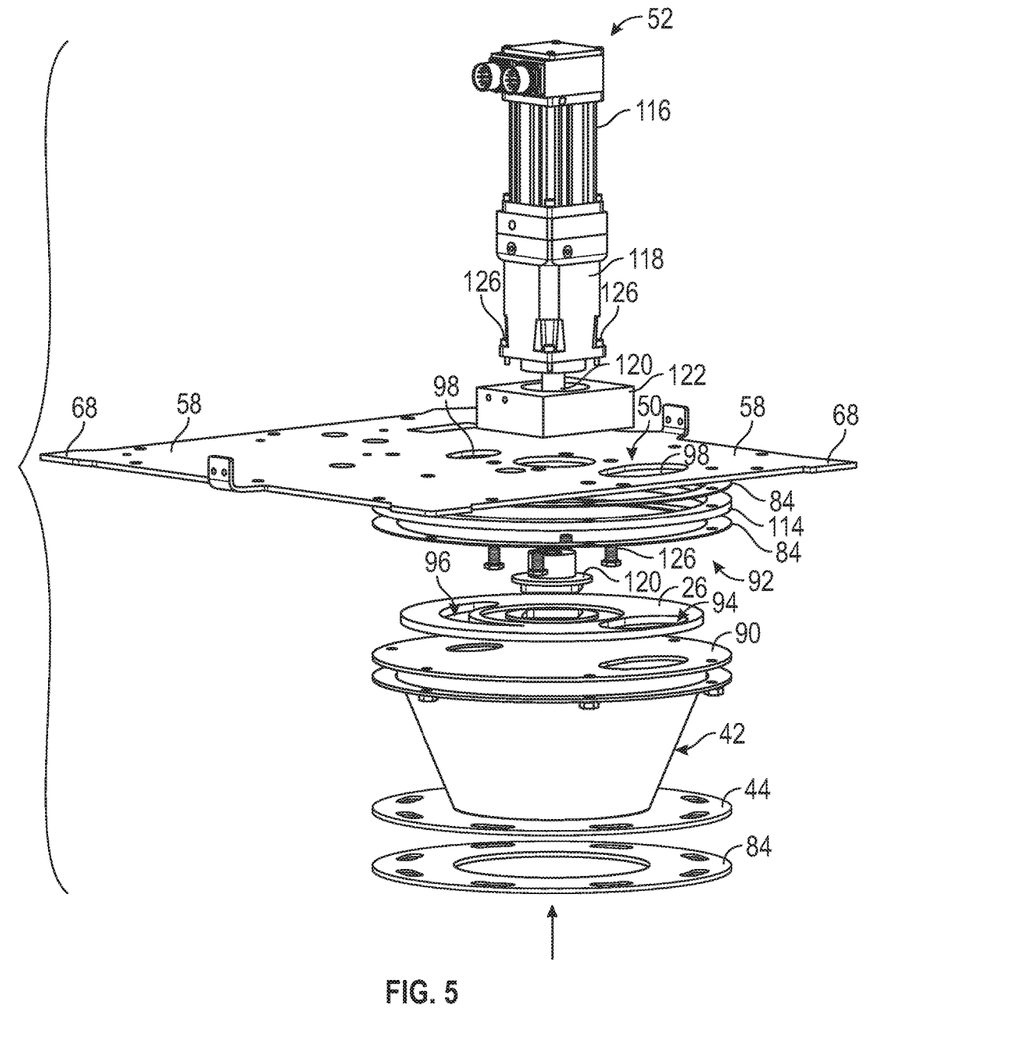
FIG. 5 is a perspective view of various mechanical components of the flow control apparatus.

In some embodiments of the invention, a gasket 84 is disposed between various components to prevent carrier fluid from leaking into the flow control apparatus 12. For example, as shown in FIG. 4, a gasket 84 is disposed between the lower inner cover 70 and the support plate 58. This prevents carrier fluid from leaking into the interior of the flow control device without passing through the filter 46. Another gasket 84 may be disposed between the tube interface 42 and the other components of the conveyance system 10. Other gaskets 84 may also be used, such as illustrated in FIG. 5 and discussed below.

The interior of the flow control apparatus 12 (e.g., the area within the inner cover 48) will now be discussed. Once carrier fluid moves into interior of the flow control apparatus 12, the carrier fluid is selectively allowed to enter the conveyance system 10, as pulled by the blower 14. Based upon sensor reading, the controller 20 sends a signal to a drive mechanism 52 which moves the mobile plate 26 between the open position and the closed position, as discussed more below. In embodiments of the invention, the carrier fluid is provided to the blower 14 by allowing the carrier fluid to enter through the outer cover opening 54, pass through the filter 46, pass through the mobile plate opening 28, and pass through a static plate opening 86. In embodiments of the invention, the controller 20 and the drive mechanism 52 are both disposed within the interior of the flow control apparatus 12. In other embodiments, at least one of the controller 20 and the drive mechanism 52 are disposed at least partially outside the interior.

The mobile plate 26 is configured to be moved by the drive mechanism 52 so as to move between an open position and a closed position. The mobile plate 26 has a mobile plate opening 28 therein. The static plate 50 has the static plate opening 86 therein. The mobile plate 26 is secured adjacent to the static plate 50. As the mobile plate 26 moves relative to the static plate 50, the at least a portion of the mobile plate opening 28 will overlap with at least a portion of the static plate opening 86. These overlaps, e.g., alignment of the respective openings, allow the carrier fluid to pass therethrough toward the blower 14. In some embodiments, the open position is defined as at least a portion of the mobile plate opening 28 being aligned with at least a portion of the static plate opening 86.

Figure 6:
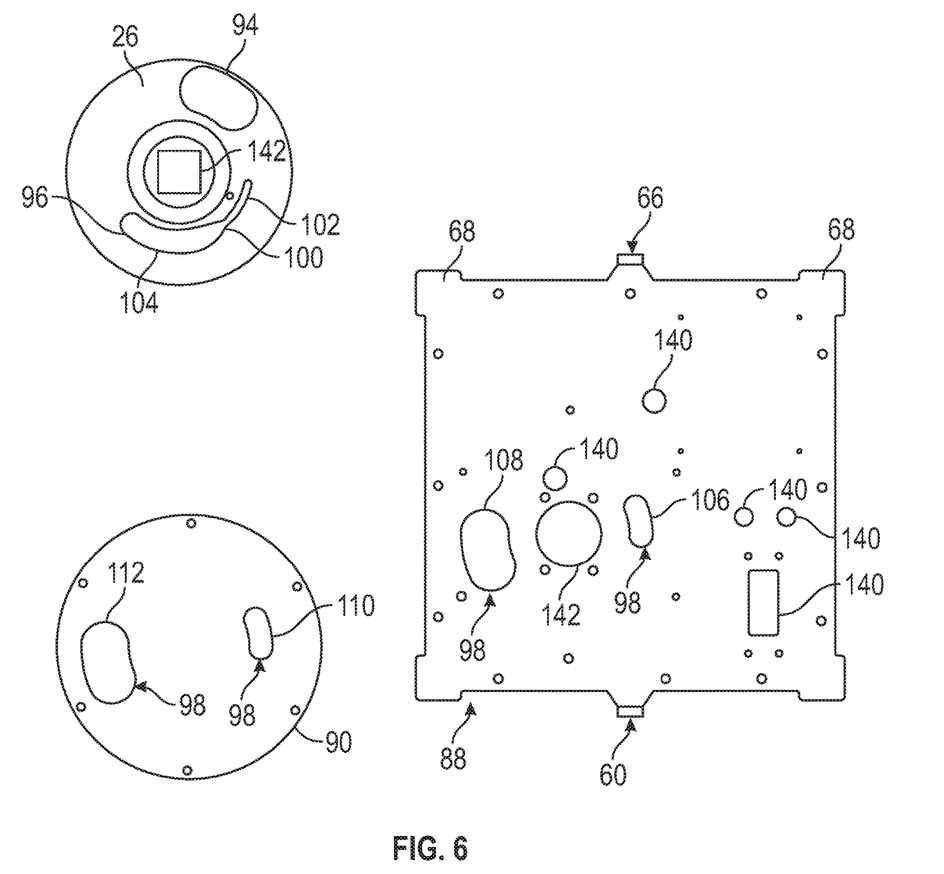
FIG. 6 is an exploded view of the flow control apparatus of FIG. 5.

In some embodiments of the invention, the mobile plate 26 presents a disk shape, as illustrated in FIG. 6. The disk shape allows the mobile plate 26 to be rotated by the drive mechanism 52 relative to the static plate 50. The drive mechanism 52 therefore rotates the mobile plate 26 to selectively place the mobile plate 26 into the open position and the closed position. Mobile plates that are rotated by the drive mechanism 52 may be referred to as "rotary mobile plates."

In other embodiments of the invention, not illustrated, the mobile plate 26 is configured to be moved laterally along the static plate 50. The drive mechanism 52 slides the mobile plate 26 selectively in a first direction and a second direction opposite the first direction. Mobile plates that are moved laterally by the drive mechanism 52 may be referred to a "lateral mobile plates." In still other embodiments of the invention, not illustrated, the mobile plate 26 is configured to pivot relative to the static plate 50. The drive mechanism 52 of these embodiments pivots the mobile plate 26 upward away from the static plate 50. Mobile plates that are rotated by the drive mechanism 52 may be referred to as "pivoting mobile plates." In some embodiments, a combination of the above-discussed embodiments is used.

The static plate 50 is stationary relative to the other components of the flow control apparatus 12, such as the outer cover 40 and the inner cover 48. The static plate 50 presents the static plate opening 86 which is configured to be aligned with the mobile plate opening 28 to allow the carrier fluid to pass therethrough. In some embodiments of the invention, the static plate 50 is the same as the support plate 58 discussed above. The static plate 50 may be a region or segment of the support plate 58, or may be separate and distinct from the support plate 58.

In some embodiments of the invention, the static plate 50 comprises an upper static plate 88 and a lower static plate 90.

The upper static plate 88 is disposed parallel to the lower static plate 90. The upper static plate 88 and the lower static plate 90 therefore present a void 92 therebetween. The mobile plate 26 is configured to be disposed in the void 92. The mobile plate 26 presents a thickness that is substantially the same as or slightly less than a corresponding thickness of the void 92. This allows the mobile plate 26 to move within the void 92. In embodiment of the invention, the static plate opening 86 is disposed through both the upper static plate 88 and the lower static plate 90. The two respective static plate openings 86 may be aligned of and substantially the same size and shape. This allows the carrier fluid to pass therethrough to the extent that the mobile plate opening 28 overlaps the respective static plate openings 86. In other embodiments, the respective static plate openings 86 may differ in alignment, size, and/or shape. As further discussed below, the static plate opening 86 may be used singularly to refer to two vertically aligned static plate openings 86 in the upper static plate 88 and the lower static plate 90, respectively.

The plate openings will now be discussed in more detail, as best illustrated in FIG. 6. FIG. 6 illustrates the upper static plate 88 (being the same as the support plate 58 in this embodiment), the mobile plate 26, and the lower static plate 90. The plate openings allow the flow control apparatus 12 to precisely control the amount of carrier fluid that is allowed to enter the conveyance system 10. In embodiments of the invention, the mobile plate 26 includes an unrestricted mobile opening 94 and a variably-restricted mobile opening 96. In other embodiments of the invention, more or fewer openings may be used. The unrestricted mobile opening 94 and the variably-restricted mobile opening 96 are used herein to explain concepts to the reader.

The unrestricted mobile opening 94 presents a shape configured to allow for unrestricted flow of the carrier fluid into the conveyance system 10. The unrestricted mobile opening 94 may present a shape that is substantially the same as or complementary to an unrestricted static opening 98 of the static plate 50. As such, alignment of the unrestricted mobile opening 94 and the unrestricted static opening 98 allows for maximum airflow. The unrestricted mobile opening 94 may present at least one arcuate end configured to variably restrict air flow in an intermediate position.

The variably-restricted mobile opening 96 presents a shape configured to variably restrict the amount of carrier fluid that is permitted to pass therethrough. Variable restriction allows only a certain percentage, fraction, or other ratio of carrier fluid to pass through (compared to a full open position). The variably-restricted mobile opening 96 may present a taper 100 or other shape that allows the controller 20 to variably restrict the air flow. The variably-restricted mobile opening 96 may include a narrow segment 102 and a wide segment 104 with the taper 100 therebetween. The narrow segment 102 presents a smaller open cross-sectional area that the wide segment 104. The variably-restricted mobile opening 96 may present a shape that is substantially different from a variably-restricted static opening. As such, the variably-restricted mobile opening 96 and the variably-restricted static opening may each present a different cross-sectional area and/or shape in a given position.

An exemplary layout of the plate openings is illustrated in FIG. 7A-7D. As shown, the mobile plate 26 is illustrated atop the lower static plate 90 (shown in broken line). For the sake of clarity, the upper static plate 88 is not illustrated. Shown are four exemplary positions of the mobile plate 26 relative to the static plate 50. The four positions include a full-closed position (in FIG. 7A), a slight-open position (in FIG. 7B), a mid-open position (in FIG. 7C), and a full-open position (in FIG. 7D). It should be appreciated that these four positions are achieved by rotating the mobile plate 26 counter-clockwise relative to the static plate 50. Each respective position is illustrated as approximately forty-five degrees from the respective neighbors, as an example. It should also be appreciated that numerous intermediate positions between those illustrated positions may be achieved at intermediate locations therebetween.

Figure 7A:
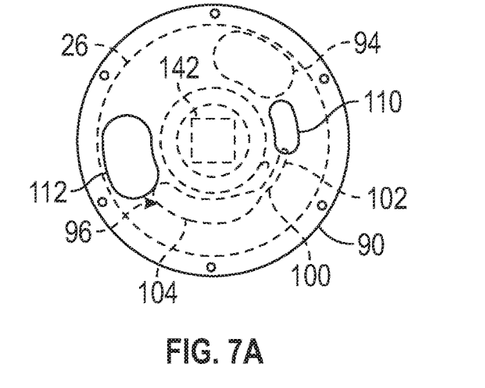
FIG. 7A-D is a top view of the mobile plate overlaid on the lower static plate, presented in four relative orientations.
Figure 7B:
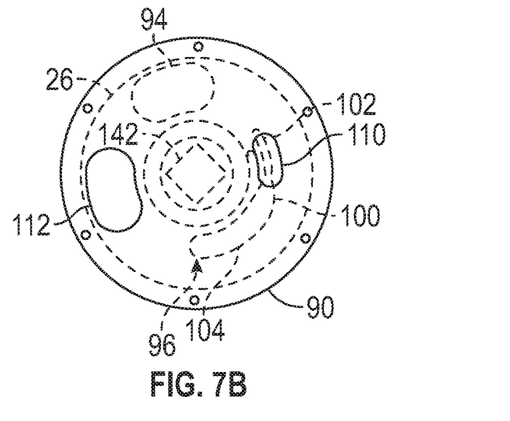
Figure 7C:
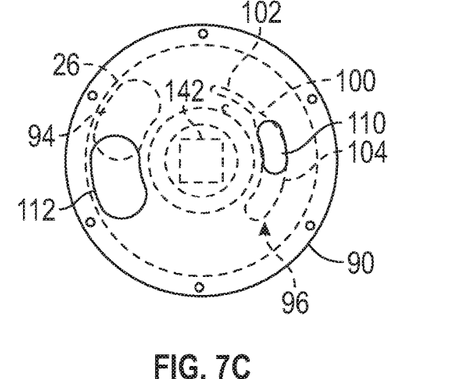
Figure 7D:
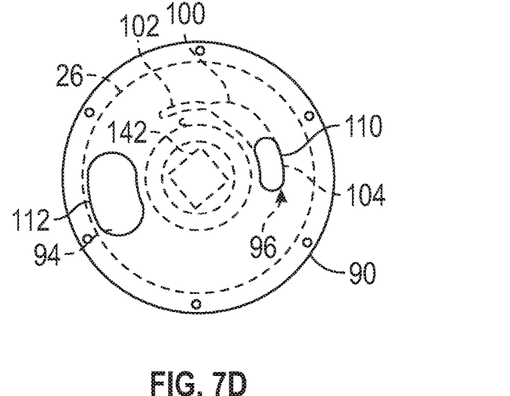

The full-open position in FIG. 7D presents a maximum open surface area. The maximum open surface area allows the maximum amount of carrier fluid to pass therethrough. For a given pressure provided by the operating blower 14, the maximum open surface area will provide the greatest mass flow rate of the carrier fluid into the blower 14. Comparing the full-open position to the other positions gives a percentage of the maximum open surface area. For example, FIG. 7A may show 0% of the maximum open surface area; FIG. 7B may show 10% of the maximum open surface area; and FIG. 7C may show 40% of the maximum open surface area. Each illustrated position may be associated with a radial location of the mobile plate 26 relative to the static plate 50. In order to achieve a desired flow, based upon the below-discussed calculations, the drive mechanism 52 rotates the mobile plate 26 to that radial location. The drive mechanism 52 may then rotate the mobile plate 26 to another radial location based upon an updated desired flow, based upon a subsequent sensor reading.

It should be appreciated that the illustrated layout of the unrestricted mobile opening 94 and the variably-restricted mobile opening 96 are only exemplary, and that any of numerous layouts could be utilized to achieve a similar result. In some embodiments, the unrestricted mobile opening 94 is adjacent to, associated with, or the same as the variably-restricted mobile opening 96. In other embodiments, there is no unrestricted mobile opening 94, such that all carrier fluid flows through a variably-restricted mobile opening 96. The terms unrestricted and variably restricted refer to the general size and shapes of the openings. The carrier fluid may be variably restricted through the unrestricted mobile opening 94, and the carrier fluid may be unrestricted through the variably-restricted mobile opening 96 (depending on the relative locations).

The static plate openings 86 are disposed above and/or below the mobile plate opening 28. In embodiments of the invention, the upper static plate 88 presents a first upper static opening 106 configured to correspond to the variably-restricted mobile opening 96 and a second upper static opening 108 configured to correspond to the unrestricted mobile opening 94. Similarly, the lower static plate 90 presents a first lower static opening 110 configured to correspond to the variably-restricted mobile opening 96 and a second lower static opening 112 configured to correspond to the unrestricted mobile opening 94. The second upper static opening 108 and the second lower static opening 112 may present substantially the same size and shape as the unrestricted mobile opening 94. The first upper static opening 106 and the first lower static opening 110 may present a substantially different size and/or shape as the variably-restricted mobile opening 96, such that the cross-sectional area can be more accurately controlled by the controller 20 and the drive mechanism 52.

In some embodiments of the invention, a spacer 114 is disposed between the upper static plate 88 and the lower static plate 90. In some embodiments, such as illustrated in FIG. 5, the spacer 114 presents an annular shape. The upper static plate 88, the lower static plate 90, and the spacer 114 may therefore present the void 92 therein. In embodiments of the invention, the mobile plate 26 is disposed within the void 92. The spacer 114 prevents carrier fluid from seeping laterally between the mobile plate 26 and the respective static plates 88,90.

In some embodiments of the invention, the flow control apparatus 12 further includes at least one gasket 84 disposed between the upper static plate 88 and spacer 114, and/or between the lower static plate 90 and the spacer 114. The gasket 84 prevents carrier fluid from seeping out of the void 92 other than through the aligned openings discussed above. For example, when the mobile plate 26 is in the closed position (such as illustrated in FIG. 7A), a negative pressure at the lower static plate 90 generated by the blower 14 may pull carrier fluid out of the void 92 if the gasket 84 was not present.

Figure 8:
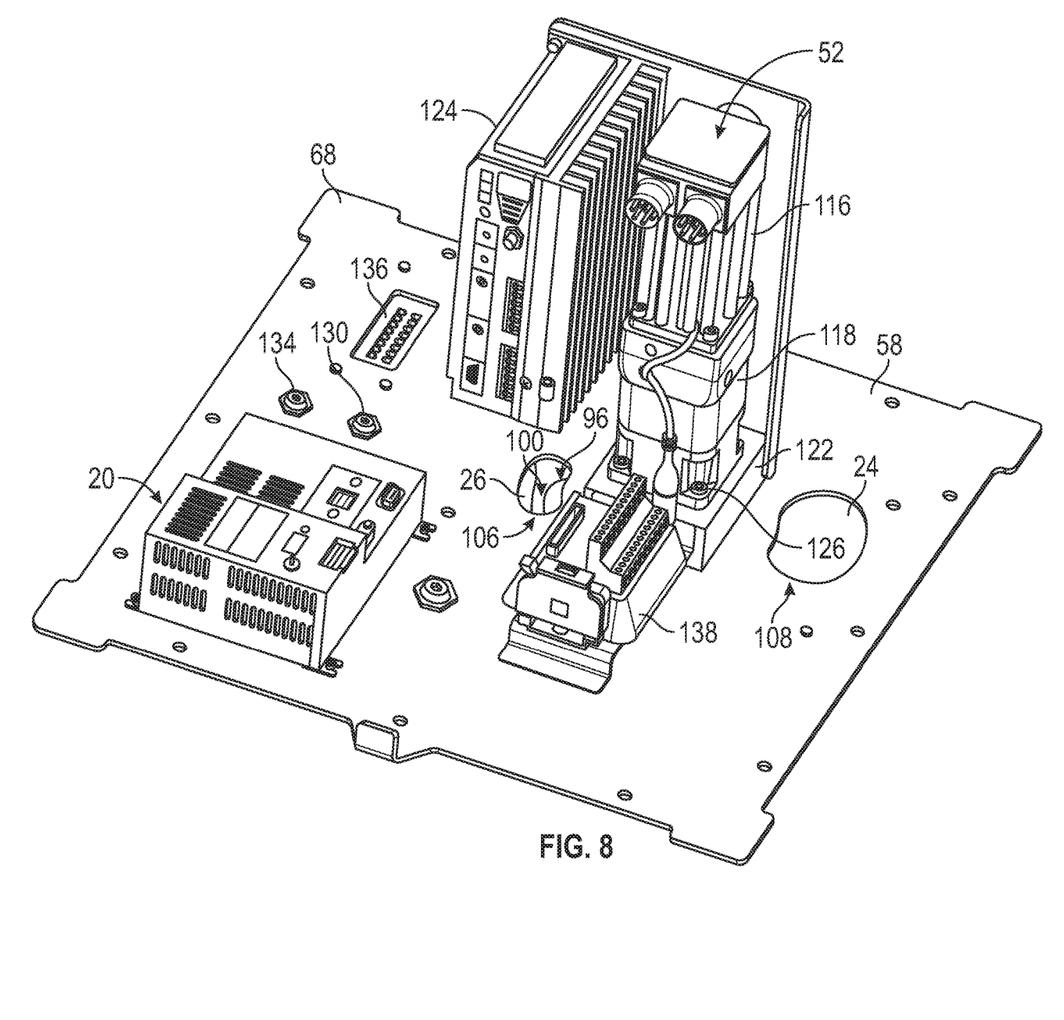
FIG. 8 is a perspective view of various electronic components of the flow control apparatus.

Turning to FIG. 8, the drive mechanism 52 will now be discussed in more detail. The drive mechanism 52 is configured to selectively place the mobile plate 26 into an open position and a closed position. In embodiments of the invention, the drive mechanism 52 includes a motor body 116, a gear box 118, a drive shaft 120 (illustrated in FIG. 5), a motor mount 122, and a motor controller 124. The motor body 116 imparts a rotation within the gear box 118. The gear box 118 in turn rotates the drive shaft 120. For example, the gear box 118 may be a 50:1 reduction gearbox such that rotations of the motor are translated into small rotations of the drive shaft 120, or other appropriate reduction. This allows for precise control of the mobile plate 26. The drive shaft 120 is secured to the mobile plate 26, such that a rotation of the drive shaft 120 is translated to the mobile plate 26. The motor body 116 and the gear box 118 are secured to the support plate 58 by the motor mount 122 via at least one fastener 126. The drive shaft 120 passes through the motor mount 122 so as to prevent the rotating motor mount 122 from interfering with other components. The motor controller 124 instructs (either through digital commands or in the form of power supplied) the drive mechanism 52 to operate. The motor controller 124 may control the direction of rotation, speed or rate of rotation, and position of the drive shaft 120. The motor controller 124 tracks a number of rotations performed by the drive shaft 120 and will compensate for the reduced movement of the drive shaft 120 of the gear box 118.

The controller 20 will now be discussed in more detail. The controller 20 controls the drive mechanism 52 so as to achieve a desired flow rate. The controller 20 instructs the drive mechanism 52 (via the motor controller 124) to selectively place the mobile plate 26 into the open position and the closed position based at least in part on the pressure reading. In embodiments of the invention, the controller 20 is a programmable logic circuit (PLC), a human-machine interface (HMI), or other integrated circuit. The controller 20 is communicatively coupled to the pressure sensors. The controller 20 receives pressure readings from each pressure transducer. As best illustrated in FIG. 1, in embodiments of the invention, the first pressure transducer in a blower inlet tube 128 (e.g., between the blower 14 and the flow control apparatus 12) enters through a first connection 130 to provide a first pressure reading to the controller 20. The second pressure transducer in a blower outlet tube 132 (e.g., downstream of the blower 14) enters through a second connection 134 to provide a second pressure reading to the controller 20.

A communication port 136, such as a multi-pin connector, provides communicative coupling to the other components of the conveyance system 10. This can include control commands to initiate and cease operations. The communication port 136 is configured to receive a cable (not illustrated) thereto to receive these commands. A terminal block 138 may also be used to provide connection for power and/or communication wires between the various electronic components discussed above. The various components discussed above may be disposed on the support plate 50. The various components may be disposed at least partially within or otherwise associated with a mounting opening 140. There may be other openings in the support plate 50, such as a drive shaft opening 142 configured to receive therethrough the drive shaft 120 of the drive mechanism 52.

The calculations in the controller 20 are based on the objective of maintaining a constant air or gas flow through the tubular convey line as the system under goes varying pressures. System components leak varying volumes of gas depending upon the differential pressure across the component. The subject control device and method compensates for those loses during operation.

The flow control apparatus 12 maintains a constant flow of carrier fluid through the convey line as the system builds pressure and air or gas losses increase due to system component leakage and blower inefficiency. The controller 20 controls the system by reading the line pressure ($P_L$) and calculating a target inlet blower pressure ($P_I$). This calculation may occur periodically, such that a current status of the pressure is determined. For example, the calculation may occur on a controlled frequency between 5 Hz and 60 Hz. The inner components of the flow control apparatus 12 then move to a position to make the actual $P_I$ equal to the calculated $P_I$.

A method of controlling an amount of carrier fluid in a conveyance system 10 will now be discussed. In some embodiments, the method comprises the following steps: receiving, from a first pressure transducer, a first pressure reading from an upstream location relative to the blower 14 that is indicative of an inlet pressure; receiving, from a second pressure transducer, a second pressure reading from a downstream location relative to the blower 14 that is indicative of an outlet pressure; determining, based at least in part on the first pressure reading and the second pressure reading, an ideal upstream pressure for a constant flow rate through the blower 14; and instructing a drive mechanism 52 to move a mobile plate 26 to an open position such that the inlet pressure approaches the ideal upstream pressure. As discussed above, the drive mechanism 52 rotates the mobile plate 26 relative to the static plate 50, and the mobile plate 26 presents a mobile opening and the static plate 50 presents a static opening. The open position is defined as at least a portion of the mobile opening overlapping with at least a portion of the static opening.

In some embodiments, the method may further comprise the following steps: receiving, from a conveyance control system (not illustrated), an instruction to cease operation; and instructing the drive mechanism 52 to move the mobile plate 26 to a default position. The method may also further comprise the following steps: receiving, from the first pressure transducer at a later time, an updated first pressure reading that is indicative of the inlet pressure at the later time; receiving, from the second pressure transducer at a later time, an updated second pressure reading that is indicative of the outlet pressure at the later time; determining, based at least in part on the first pressure reading and the updated first pressure reading, a rate of pressure change provided to the blower 14; and instructing, based at least in part of the rate of pressure change, the drive mechanism 52 to move a mobile plate 26 to a second open position such that the inlet pressure approaches the ideal upstream pressure.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. A tubular conveyance system comprising:
   a pressure sensor configured to measure a pressure within a conveyance tube;
   a blower configured to accelerate a carrier fluid into the conveyance tube,
   wherein the blower has a blowing direction which defines an upstream position and a downstream position relative to the blower;
   a material feeder configured to add a conveyance material to the conveyance tube to be conveyed by the carrier fluid,
   wherein the material feed is disposed in the downstream position relative to the blower; and
   a flow control apparatus configured to control an amount of carrier fluid provided to the blower,
   wherein the flow control apparatus is disposed in the upstream position relative to the blower,
   wherein the flow control apparatus includes
      a mobile plate having a mobile plate opening therein, and
      a drive mechanism configured to selectively place the mobile plate into an open position and a closed position,
      wherein the open position is defined as at least a portion of the mobile plate opening being aligned so as to allow carrier fluid to flow therethrough.

2. The tubular conveyance system of claim 1, wherein the flow control apparatus is disposed in the upstream relative to the blower so as to control an amount of carrier fluid into the blower.

3. The tubular conveyance system of claim 1,
   wherein the carrier fluid is air,
   wherein the pressure sensor includes a first pressure transducer disposed in the upstream position relative to the blower and a second pressure transducer disposed in the downstream position relative to the blower.

4. The tubular conveyance system of claim 1,
   wherein the pressure sensor is associated with the flow control apparatus to provide a pressure reading to the flow control apparatus,
   wherein the drive mechanism selectively places the mobile plate into the open position and the closed position based at least in part on the pressure reading.

5. The tubular conveyance system of claim 4, wherein the flow control apparatus further includes:
   a controller configured to instruct the drive mechanism to move the mobile plate,
   wherein the controller is communicatively coupled to the pressure sensor.

6. The tubular conveyance system of claim 1,
   wherein the mobile plate presents a disk shape,
   wherein the drive mechanism rotates the mobile plate to selectively place the mobile plate into the open position and the closed position.

7. The tubular conveyance system of claim 1, wherein the flow control apparatus further includes:
   a static plate having a static plate opening therein,
   wherein the mobile plate is secured adjacent to the static plate,
   wherein the open position is defined as at least a portion of the mobile plate opening being aligned with at least a portion of the static plate opening.

8. The tubular conveyance system of claim 7, wherein the flow control apparatus further includes a gasket disposed between the static plate and the mobile plate to facilitate movement of the mobile plate relative to the static plate.

9. The tubular conveyance system of claim 7, wherein the flow control apparatus further includes:
   an outer cover having an outer cover opening therein;
   a filter associated with the outer cover,
   wherein the mobile plate and the drive mechanism are disposed within the outer cover,
   wherein the carrier fluid is provided to the blower by allowing the carrier fluid to enter through the outer cover opening, pass through the filter, pass through the mobile plate opening, and pass through the static plate opening.

10. A flow control apparatus configured to control an amount of carrier fluid provided to a blower of a tubular conveyance system, the flow control apparatus comprising:
    a mobile plate having a mobile plate opening therein;
    a static plate having a static plate opening therein,
    wherein the mobile plate is secured adjacent to the static plate;
    a drive mechanism configured to selectively place the mobile plate into an open position and a closed position,
    wherein the open position is defined as at least a portion of the mobile plate opening being aligned with at least a portion of the static plate opening;
    an outer cover having an outer cover opening therein;
    a filter associated with the outer cover,
    wherein the mobile plate and the drive mechanism are disposed within the outer cover,
    wherein the carrier fluid is provided to the blower by allowing the carrier fluid to enter through the outer cover opening, pass through the filter, pass through the mobile plate opening, and pass through the static plate opening.

11. The flow control apparatus of claim 10, further comprising:
    a first pressure transducer configured to be disposed upstream of the blower; and
    a second pressure transducer configured to be disposed downstream of the blower.

12. The flow control apparatus of claim 11,
    wherein the first pressure transducer and the second pressure transducer each provide a pressure reading to the flow control apparatus,
    wherein the drive mechanism selectively places the mobile plate into the open position and the closed position based at least in part on a pressure differential between the pressure reading of the first pressure transducer and the pressure reading of the second pressure transducer.

13. The flow control apparatus of claim 11, further comprising:
    a controller configured to instruct the drive mechanism to move the mobile plate,
    wherein the controller is communicatively coupled to the first pressure transducer and the second pressure transducer.

14. The flow control apparatus of claim 10,
wherein the mobile plate presents a disk shape,
wherein the drive mechanism moves the mobile plate relative to the static plate to selectively place the mobile plate into the open position and the closed position.

15. The flow control apparatus of claim 10, wherein the flow control apparatus further includes a gasket disposed between the static plate and the mobile plate to facilitate movement of the mobile plate relative to the static plate.

16. The tubular conveyance system of claim 4, wherein the controller is further configured to calculate a target upstream pressure for a constant flow rate through the tubular convey system.

17. The tubular conveyance system of claim 16, wherein the controller is further configured to instruct the drive mechanism to move the mobile plate to the open position such that an inlet pressure approaches the target upstream pressure.

18. The flow control apparatus of claim 13, wherein the controller is further configured to calculate a target upstream pressure for a constant flow rate through the blower.

19. The flow control apparatus of claim 18, wherein the controller is further configured to instruct the drive mechanism to move the mobile plate to the open position such that an inlet pressure approaches the target upstream pressure.

* * * * *